United States Patent
Crafton

(10) Patent No.: US 8,255,707 B2
(45) Date of Patent: Aug. 28, 2012

(54) SYSTEM AND METHOD FOR PROVIDING A ONE-STEP TESTING ARCHITECTURE

(75) Inventor: Gregory L. Crafton, Flower Mound, TX (US)

(73) Assignee: Fujitsu Limited, Kawasaki (JP)

( * ) Notice: Subject to any disclaimer, the term of this patent is extended or adjusted under 35 U.S.C. 154(b) by 1210 days.

(21) Appl. No.: 12/043,488

(22) Filed: Mar. 6, 2008

(65) Prior Publication Data

US 2009/0228731 A1 Sep. 10, 2009

(51) Int. Cl.
- G06F 9/44 (2006.01)
- G06F 9/46 (2006.01)
- G06F 15/16 (2006.01)
- G06F 13/12 (2006.01)
- G06F 13/20 (2006.01)
- G06F 13/00 (2006.01)
- G06F 11/00 (2006.01)
- G01R 31/28 (2006.01)
- G06G 12/00 (2006.01)
- H04M 1/00 (2006.01)

(52) U.S. Cl. ........ 713/300; 717/127; 718/108; 709/321; 710/64; 710/313; 710/316; 714/28; 714/724; 714/733; 714/726; 711/111; 455/561; 324/537; 327/74; 257/393; 341/51; 307/147; 307/140

(58) Field of Classification Search .......... 717/127; 718/108; 709/321; 710/64, 313, 316; 714/28, 714/724, 733, 726; 711/111; 455/561; 324/537; 327/74; 257/393; 341/51; 307/147, 140
See application file for complete search history.

(56) References Cited

U.S. PATENT DOCUMENTS

| | | | | |
|---|---|---|---|---|
| 4,912,403 A * | 3/1990 | Siefers | ........................ | 324/537 |
| 5,406,567 A * | 4/1995 | Ogawa | ........................ | 714/724 |
| 5,530,302 A * | 6/1996 | Hamre et al. | ............... | 307/147 |
| 5,565,801 A * | 10/1996 | Ernst | ............................. | 327/74 |
| 6,279,060 B1 * | 8/2001 | Luke et al. | ..................... | 710/64 |
| 6,355,991 B1 * | 3/2002 | Goff et al. | ..................... | 307/140 |
| 6,363,452 B1 * | 3/2002 | Lach | ............................ | 710/316 |
| 6,871,309 B1 * | 3/2005 | Smith | ............................ | 714/724 |
| 7,082,598 B1 * | 7/2006 | Le et al. | ........................ | 717/127 |
| 7,383,481 B2 * | 6/2008 | Warren et al. | ............... | 714/726 |
| 7,814,496 B2 * | 10/2010 | Panesar et al. | .............. | 718/108 |
| 2002/0098869 A1 * | 7/2002 | Struhsaker et al. | .......... | 455/561 |
| 2003/0023904 A1 * | 1/2003 | Yamaguchi et al. | ........... | 714/28 |
| 2004/0003135 A1 * | 1/2004 | Moore | ........................ | 709/321 |
| 2004/0238899 A1 * | 12/2004 | Fischer et al. | ............... | 257/393 |
| 2007/0096960 A1 * | 5/2007 | Hauser | ........................ | 341/51 |
| 2007/0186037 A1 * | 8/2007 | Winzenried et al. | ......... | 711/111 |
| 2008/0071962 A1 * | 3/2008 | Yang et al. | ..................... | 710/313 |
| 2008/0256284 A1 * | 10/2008 | Evoy et al. | ..................... | 710/316 |
| 2009/0019331 A1 * | 1/2009 | Geissler | ....................... | 714/733 |

* cited by examiner

Primary Examiner — Thomas Lee
Assistant Examiner — Aurel Prifti
(74) Attorney, Agent, or Firm — Baker Botts L.L.P.

(57) ABSTRACT

In one embodiment, a method includes powering on a testing system, whereby a unit present signal is included in the system, the unit present signal communicating to a management complex unit (MCU) that a unit under test (UUT) has been inserted into a corresponding architecture, the signal being sent through a relay such that it can be sent or connected at a later time. The UUT is installed in the system and a programming protocol is initiated. The system is then powered off, whereby the unit present signal is set to open and the system is subsequently powered on.

When the UUT is plugged in, the MCU does not see it. The system can include a second relay that allows power being fed to the UUT to be broken such that when the UUT is subsequently powered up, the board is reset and not removed from the architecture.

20 Claims, 1 Drawing Sheet

SYSTEM AND METHOD FOR PROVIDING A ONE-STEP TESTING ARCHITECTURE

TECHNICAL FIELD OF THE INVENTION

This invention relates generally to the field of testing and, more specifically, to a system and a method for providing a one-step testing architecture.

BACKGROUND OF THE INVENTION

Joint Test Action Group (JTAG) testing is ubiquitous in today's circuit board manufacturing environment. However, current testing protocols do have their drawbacks. Typical problems in this area include increased test time, which is typically due to handling products when performing JTAG/programming and/or system tests of printed circuit boards (PCB) used in "hot insertion" systems.

Performing the JTAG/programming in the system creates three clear problems. The first problem is the failure of a unit under test (UUT), which is done by the management complex unit (MCU) due to inserting the un-programmed PCB in the system. The second problem is the interference by the management complex trying to access the UUT while performing JTAG testing. The third problem is the initialization of the PCB after programming without removing and reinstalling the UUT, or the power down of the entire system causing an extended reboot cycle.

Thus, a method is needed to address these problems (and others): not only in the JTAG environment, but also in other testing environments in which timing constraints are critical. The ability to properly resolve these significant testing issues creates an interesting challenge for programmers, software engineers, and manufacturers alike.

SUMMARY OF THE INVENTION

The present invention provides a method and a system for providing a one-step testing approach that substantially eliminates or reduces at least some of the disadvantages and problems associated with previous methods and systems.

In accordance with a particular embodiment of the present invention, a method is offered that includes powering on a testing system, whereby a unit present signal is included in the system, the unit present signal communicating to a management complex unit (MCU) that a unit under test (UUT) has been inserted into a corresponding architecture. The signal is sent through a relay such that it can be sent or connected at a later time. The method further includes installing the UUT in the system and initiating a programming protocol. The method also includes powering off the system, whereby the unit present signal is set to open and the system is subsequently powered on.

In more detailed embodiments, when the UUT is plugged in, the MCU does not see or acknowledge it. In still other more specific (but non-limiting embodiments), the programming protocol is performed by a Joint Test Action Group (JTAG) element that is connected to the architecture and which can be coupled through a backplane.

After the UUT is programmed, the testing system is powered down and then powered up to reset or initiate programmed components of the UUT. The system includes a second relay that allows power being fed to the UUT to be broken such that when the UUT is subsequently powered up, the board is reset and not removed from the architecture. Ultimately, a final test can be performed on the architecture, whereby the UUT can be seen as programmed and the MCU can see the UUT as functional.

Technical advantages of particular embodiments of the present invention include providing the ability to eliminate the need for a JTAG/programming test jig. Such a methodology also reduces test time by eliminating the movement of the PCB between the JTAG/programming test jig and the system test. Other advantages are detailed below with reference to corresponding FIGURES.

In addition, other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
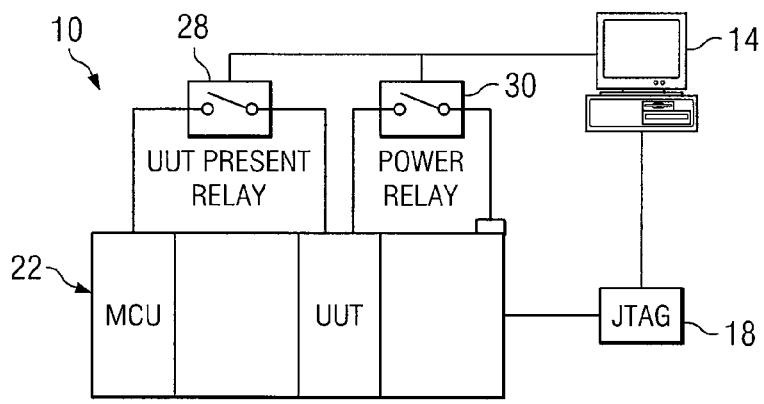
FIG. 1 is a simplified hardware block diagram illustrating an example system for providing a one-step test architecture.

FIG. 1 is a simplified block diagram illustrating an example system 10 that provides a one-step testing protocol. System 10 includes a central processing unit (CPU) 14 and a Joint Test Action Group (JTAG) element 18, which can be connected as shown in FIG. 1 or connected through the backplane. System 10 also includes a shelf 22 that comprises a unit-under-test (UUT) component and a management complex unit (MCU), which 'sees' when a given board is installed. This particular connection needs to be broken such that the MCU does not see the board when it is initially plugged in, as detailed further below and with explicit reference to FIG. 2.

The spaces between the MCU and the UUT are simply slots of the shelf (which may or may not be empty). System 10 further includes a UUT present relay 28 (coupled to the MCU and the UUT) and a power relay 30 (coupled to the UUT). The backplane can be modified to isolate those two signals, where a relay is properly positioned for each component, as described in greater detail below.

In regards to the JTAG protocol, JTAG is the name used for the IEEE 1149.1 standard for test access ports used for testing printed circuit boards using boundary scan. Designed for printed circuit boards, JTAG can be used for accessing sub-blocks of integrated circuits, and is also useful as a mechanism for debugging embedded systems: providing a convenient "back door" into the system. When used as a debugging tool, an in-circuit emulator, which in turn uses JTAG as the transport mechanism, enables a programmer to access an on-chip debug module, which is integrated into the CPU, via the JTAG interface. The debug module enables the programmer to debug the software of an embedded system.

It is imperative to note that any circuit board that includes programmable parts could implement the present invention. JTAG has been discussed throughout this document, but other protocols (e.g., Altera, Xilinx, etc.) could certainly benefit from the teachings of the present invention and are clearly within the present invention's scope.

As a broad overview, system 10 operates to modify the backplane of the system to allow power to the UUT and the "unit present" signal to be controlled by the test set software. As outlined above, JTAG/programming of the PCB in a given system creates three salient problems. Modifications to the backplane of system 10 can help address these problems, as highlighted in the hardware block diagram of FIG. 1.

The first of these three problems is the failure of a unit under test (UUT) by the MCU due to inserting the un-programmed PCB in the system. The second problem is the interference by the management complex trying to access the UUT while performing JTAG Testing. The third problem is the initialization of the PCB after programming without removing and reinstalling the UUT, or the power down of the entire system causing an extended reboot cycle.

Current technology calls for performing JTAG/programming in a jig followed by moving the PCB to the system for a final test. By using two test steps, this problem does not occur, but it increases the test time due to moving the PCB between the test fixtures. The method proposed by the present invention allows these steps to be combined and performed in system 10 during the final test stage without additional handling.

The "one step" manufacturing test process combines the JTAG/programming and system test of the PCB in "hot insertion" systems. The first two problems of: 1. failure of the PCB by the MCU due to inserting the un-programmed PCB in the system; and 2. interference by the MCU by trying to access the PCB while performing JTAG testing, are addressed by the breaking of the unit present signal to the MCU and controlling it with a relay or other circuitry. This lets the "Tester" control when the MCU will be aware of the PCB being installed in the shelf. The switch is closed after JTAG/Programming and before system tests start.

The last problem of: 3. initialization of the PCB after programming without removing and reinstalling the PCB or the power down of the entire system causing an extended reboot cycle, is addressed by the breaking the power signals to the PCB to allow the PCB to be powered down without recycling the power to the entire shelf. This keeps the MCU and other boards in the shelf from going through a complete power down and system startup, which would increase the test time considerably.

Such a process has a number of advantages including eliminating the need for a JTAG/Programming test jig. Such a methodology also reduces test time by eliminating the movement of the PCB between the JTAG/Programming test jig and the system test.

Figure 2:
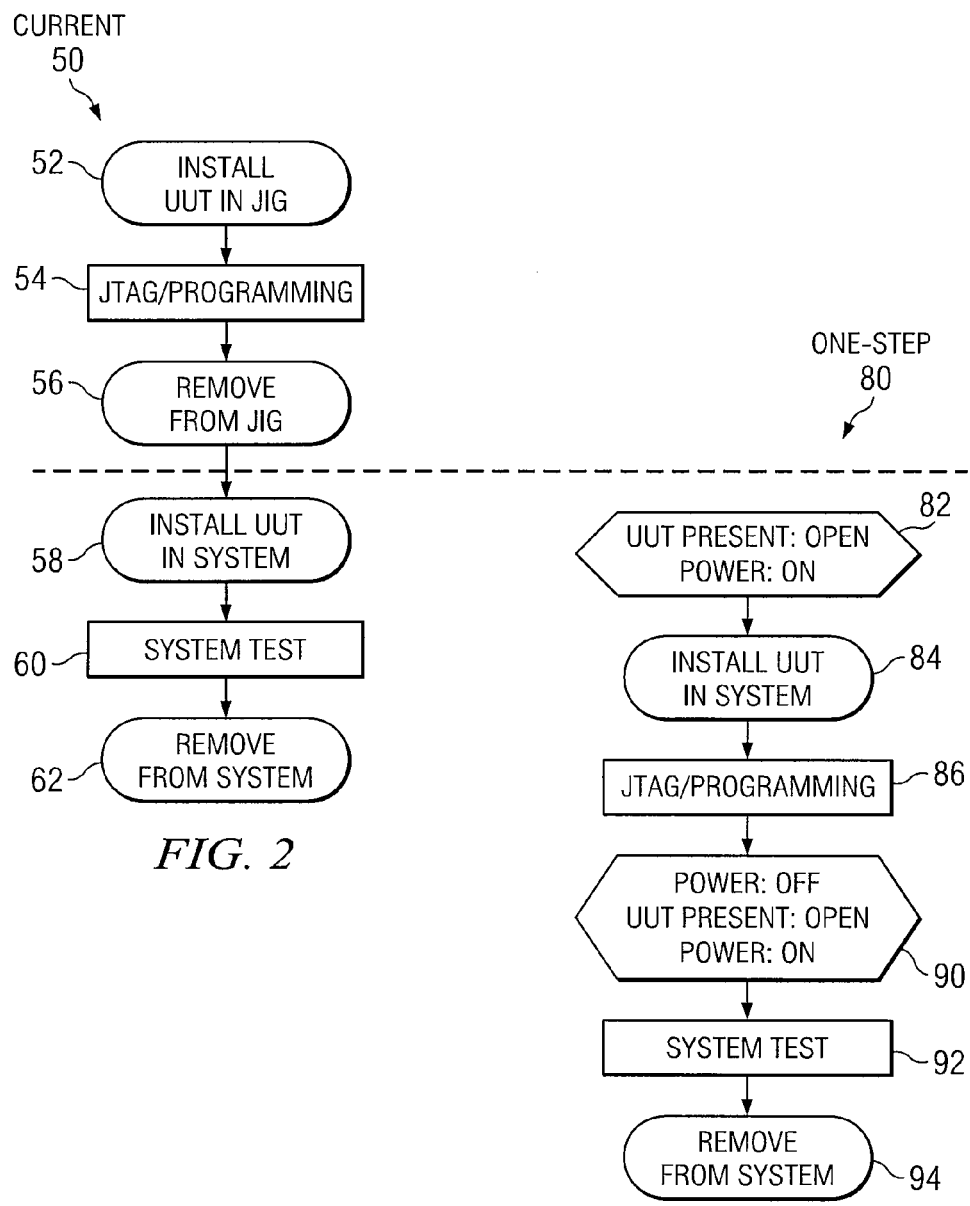
FIG. 2 illustrates a set of simplified flowcharts that outline example flows for current testing protocols and for one-step testing.

FIG. 2 illustrates a set of simplified flowcharts that outline example flows for testing. A first flow 50 is outlined as a current approach to testing. This method begins at step 52, where the UUT is installed in the jig. At step 54, JTAG/programming commences and then the UUT is removed from the jig at step 56. At step 58, the UUT is installed in the system and at step 60, a system test is performed. Finally, the UUT is removed at step 62.

In contrast to these operations, the present invention operates in the manner illustrated by a second flow 80. Note that the issue that typically inhibited a given test system [previously] from performing the proposed operations, as outlined herein, was the MCU failing the board and then the powering down/powering up re-initialization phase.

As explained by the flow 50, current JTAG testing (or unit testing) includes a board being plugged in and then components on the board being programmed. Then, the board is pulled from a given shelf and placed into a second shelf to run a final test.

One way to speed up test time and efficiency is to have a single shelf for both phases [JTAG testing and final testing]. There are problems with this approach. For example, if the board is not programmed before being inserted into the shelf, the system test will fail.

Part of the proposed architecture of system 10 includes breaking the signal (for example, a unit present signal) that tells the MCU that the board has been inserted. This signal can be sent through a relay such that it can be sent (or reconnected) at a later time. When the relay is opened, and when the board is plugged in, the MCU does not see it (or acknowledge it) and, therefore, does not fail it. In this way, JTAG can be connected to that board and the board can be programmed.

Typically, after the board is programmed, the system is powered down and then powered up to reset or initiate the programmed components. The thought is to not actually remove the board because this takes operator time and, further, incurs considerable expense. This issue is addressed with a second relay to be able to power down the board. Therefore, the power going into the board is being broken. When the board is subsequently powered up, the board is reset. At the same time, the unit present is configured. Now the board can be seen as programmed and the MCU can see the board as "good" or functional. From this point, the final test can be run. In this manner, the protocol eliminates the repeated installing/removing of the board, as well as the multiple test steps.

The problem with powering down the entire system (vs. just powering down individual slots) is that the management layer generally incurs a significant time period (shutting down, rebooting, etc.). Thus, powering down a single slot is a major advantage in such testing environments.

In terms of test goals, the following are reasonable objectives: verify the board is correctly built and functional; reduce test time; reduce cost; increase capacity; reduce test handling; increase operator efficiency; and reduce capital equipment needs.

Normal test steps include a unit test, ICT and/or JTAG testing (including programming of CPLDs, FPGAs, EPROMs, etc.); and a system test to verify the functionality at speed in a system.

As discussed herein in this document, the problem of combining JTAG/programming and a system test is the failure of the UUT by the management complex due to inserting the un-programmed PCB in the system. In regards to speed, interference by the management complex trying to access the UUT while performing programming/JTAG testing results in slower times. Again, in terms of reduced speed, initialization of the PCB after programming, without removing and reinstalling the UUT or the power down of the entire system, causes an extended reboot cycle.

In terms of the JTAG/programming in a jig followed by moving the PCB to the system for a final test, by using two test steps, this problem does not occur. But this approach increases the test time and the handling and capital equipment needs due to moving the PCB between the test fixtures. The method summarized by flow 80 of FIG. 2 allows these steps to be combined and performed in the system during a final test without any additional handling.

Flow 80 begins at step 82 with UUT present being open and the power being on. At step 84, UUT is installed in the system. At step 86, the JTAG/programming is initiated. At step 90, the power is turned off, the UUT present is open, and then the power is turned back on. The system test occurs at step 92 and the board is then properly removed at step 94.

It is critical to note that the block components illustrated in FIG. 1 may be implemented as digital circuits, hardware, analog circuits, software, or any suitable combination of these elements. In addition, any of these illustrated components may include software and/or an algorithm to effectuate their features and/or applications as described herein. The software can execute code (e.g. with a processor) such that the functions outlined herein can be performed.

Alternatively, such operations and techniques may be achieved by any suitable hardware, component, device, application specific integrated circuit (ASIC), additional software, field programmable gate array (FPGA), processor, erasable programmable ROM (EPROM), electrically erasable programmable ROM (EEPROM), or any other suitable object that is operable to facilitate such operations. Considerable flexibility is provided by the structure of these architectures in the context of this arrangement. Thus, it can be easily appreciated that such functions could be provided external to the outlined environment. In such cases, such functionality could be readily embodied in a separate component, device, or module.

While the present invention has been described in detail with specific components being identified, various changes and modifications may be suggested to one skilled in the art and, further, it is intended that the present invention encompass any such changes and modifications as clearly falling within the scope of the appended claims.

Note also that, with respect to specific process flows disclosed, any steps discussed within the flows may be modified, augmented, or omitted without departing from the scope of the invention. Additionally, steps may be performed in any suitable order, or concurrently, without departing from the scope of the invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. A method, comprising:
    powering on a testing system, whereby the testing system is configured to generate a unit present signal indicating that a unit under test (UUT) has been inserted into a corresponding architecture, the unit present signal being communicated to a management complex unit (MCU) through a relay such that the unit present signal can be sent directly to the MCU when the relay is closed or sent to the MCU at a later time when the relay is open;
    installing the UUT in the system, wherein the relay is open such that the unit present signal is not sent to the MCU;
    initiating a circuit testing programming protocol on the UUT;
    powering off the UUT, wherein the relay remains open such that the unit present signal is not sent to the MCU; and
    powering on the UUT.

2. The method of claim 1, wherein when the UUT is plugged in, the MCU does not see or acknowledge it.

3. The method of claim 1, wherein the programming protocol is performed by a Joint Test Action Group (JTAG) element that is connected to the architecture and which can be coupled through a backplane.

4. The method of claim 1, wherein after the UUT is programmed, the testing system is powered down and then powered up to reset or initiate programmed components of the UUT.

5. The method of claim 1, wherein the programming protocol relates to JTAG software.

6. The method of claim 1, wherein the system includes a second relay that allows power being fed to the UUT to be broken such that when the UUT is subsequently powered up, the board is reset and not removed from the architecture.

7. The method of claim 1, further comprising:
    performing a final test on the architecture, whereby the UUT can be seen as programmed and the MCU can see the UUT as functional.

8. The method of claim 1, wherein the programming protocol relates to a Xilinx protocol or an Altera protocol.

9. An apparatus, comprising:
    a testing system, whereby the testing system is configured to generate a unit present signal indicating that a unit under test (UUT) has been inserted into a corresponding architecture, the unit present signal being communicated to a management complex unit (MCU) through a relay such that the unit present signal can be sent directly to the MCU when the relay is closed or sent to the MCU at a later time when the relay is open, wherein the UUT can be installed in the system with the relay open such that the unit present signal is not sent to the MCU and a circuit testing programming protocol initiated on the UUT, whereby the UUT can be subsequently powered off with the relay open such that the unit present signal is not sent to the MCU and then powered on.

10. The apparatus of claim 9, wherein when the UUT is plugged in, the MCU does not see or acknowledge it.

11. The apparatus of claim 9, wherein the programming protocol is performed by a Joint Test Action Group (JTAG) element that is connected to the architecture and which can be coupled through a backplane.

12. The apparatus of claim 9, wherein after the UUT is programmed, the testing system is powered down and then powered up to reset or initiate programmed components of the UUT.

13. The apparatus of claim 9, further comprising:
    a second relay that allows power being fed to the UUT to be broken such that when the UUT is subsequently powered up, the board is reset and not removed from the architecture.

14. The apparatus of claim 9, wherein a final test is performed on the architecture, whereby the UUT can be seen as programmed and the MCU can see the UUT as functional.

15. Logic embedded in a computer readable medium such that when executed by a processor is operable to:
    power on a testing system, whereby the testing system is configured to generate a unit present signal indicating that a unit under test (UUT) has been inserted into a corresponding architecture, the unit present signal being communicated to a management complex unit (MCU) through a relay such that the unit present signal can be sent directly to the MCU when the relay is closed or sent to the MCU at a later time when the relay is open;
    open the relay before the UUT is installed in the test system such that the unit present signal is not sent to the MCU;
    initiate a circuit testing programming protocol on the UUT;
    power off the UUT, wherein the relay remains open such that the unit present signal is not sent to the MCU; and
    power on the UUT.

16. The medium of claim 15, wherein when the UUT is plugged in, the MCU does not see or acknowledge it.

17. The medium of claim 15, wherein the programming protocol is performed by a Joint Test Action Group (JTAG) element that is connected to the architecture and which can be coupled through a backplane.

18. The medium of claim 15, wherein after the UUT is programmed, the testing system is powered down and then powered up to reset or initiate programmed components of the UUT.

19. The medium of claim 15, wherein the system includes a second relay that allows power being fed to the UUT to be broken such that when the UUT is subsequently powered up, the board is reset and not removed from the architecture.

20. The medium of claim 15, wherein the code is further operable to:

perform a final test on the architecture, whereby the UUT can be seen as programmed and the MCU can see the UUT as functional.

* * * * *